No. 808,729. PATENTED JAN. 2, 1906.
M. W. DAY.
SYSTEM OF CONTROL FOR ELECTRIC MOTORS.
APPLICATION FILED MAY 15, 1905.

Witnesses.

Inventor:
Maxwell W. Day.
by Albert M. Davis
Att'y.

UNITED STATES PATENT OFFICE.

MAXWELL W. DAY, OF SCHENECTADY, NEW YORK, ASSIGNOR TO GENERAL ELECTRIC COMPANY, A CORPORATION OF NEW YORK.

SYSTEM OF CONTROL FOR ELECTRIC MOTORS.

No. 808,729.     Specification of Letters Patent.     Patented Jan. 2, 1906.

Application filed May 15, 1905. Serial No. 260,427.

*To all whom it may concern:*

Be it known that I, MAXWELL W. DAY, a citizen of the United States, residing at Schenectady, county of Schenectady, State of New York, have invented certain new and useful Improvements in Systems of Control for Electric Motors, of which the following is a specification.

The present invention relates to systems of control for electric motors, and particularly for motors employed for operating hoists or similar apparatus.

In my prior patent, No. 589,891, granted September 14, 1897, there is disclosed a system of control for simple shunt-wound motors so arranged as to propel the load in either direction, or if the load is sufficiently heavy enabling the motor to act as a generator for the purpose of producing a braking effect. For many purposes the shunt-wound motor is entirely satisfactory; but where the time factor is of the utmost importance—as, for example, in the case of ammunition-hoists—compound-wound motors are more suitable, they being by reason of the saving in current effected and the consequent reduction in heating the apparatus better adapted for rapid acceleration. Difficulty has been experienced in attempting to so adapt compound-wound motors, for the reason that in some stages of operation objectionable field conditions are obtained.

The object of the present invention is to provide means for controlling a compound-wound motor in such a manner that it may operate to good advantage in propelling a load in either direction or in acting as a braking-generator driven by the load.

To the above end I divide the series field-windings of the motor into two halves which when the motor is raising the load assist the shunt-winding to excite the field, when the motor is lowering a light load oppose each other, but in the aggregate assist the shunt-winding, and when the motor is overhauled by the load and becomes a generator assist the shunt-winding.

A full understanding of the present invention in its various aspects may be had from the following detailed description, aided by the accompanying drawings, which illustrate one form thereof.

Figure 1:
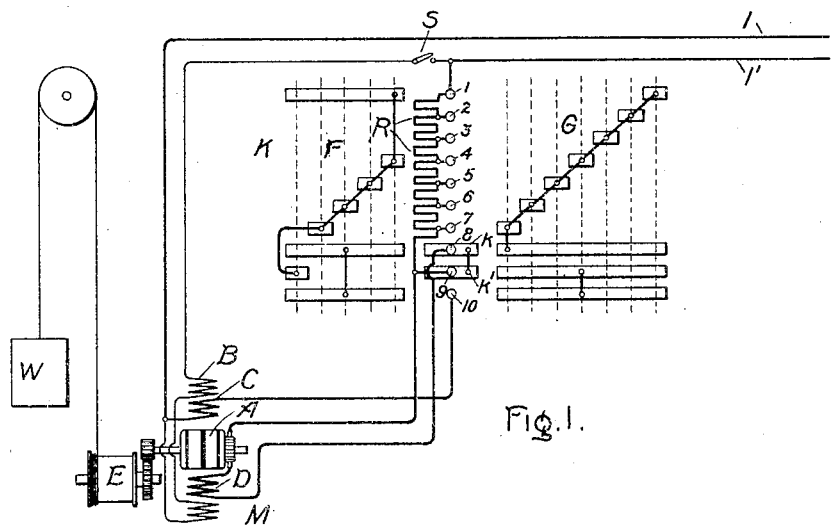
Figure 2:
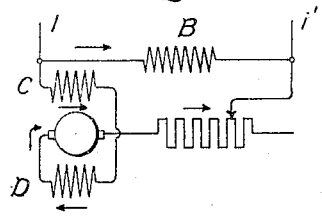
Figure 4:
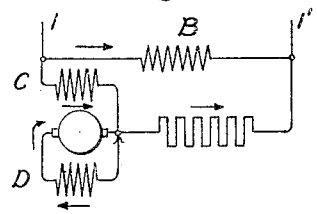
Figure 7:
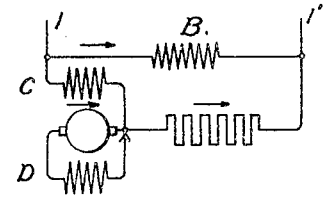
Figure 3:
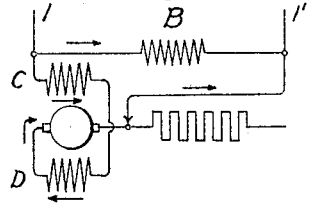
Figure 5:
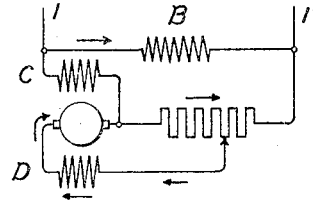
Figure 8:
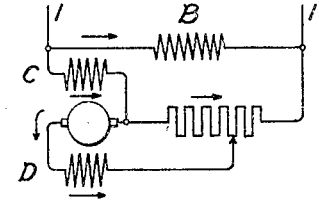
Figure 6:
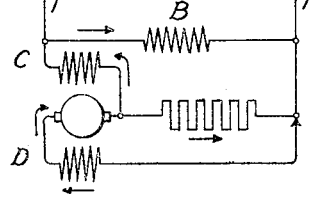
Figure 9:
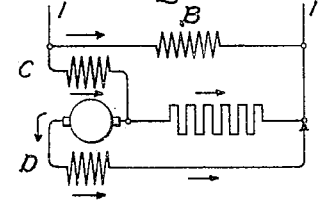

In the drawings, Figure 1 is a diagrammatic representation of a hoisting system arranged in accordance with the present invention. Figs. 2 and 3 show certain motor connections when the motor is raising a load. Figs. 4, 5, and 6 show certain motor connections when the motor is acting as a generator, and Figs. 7, 8, and 9 are views similar to Figs. 4, 5, and 6, but showing the direction of current when the motor is acting as a motor to lower a light load.

Similar reference characters will be used throughout the specification and drawings to denote like parts.

Reference being had to Fig. 1, M indicates a motor having an armature A, the shunt field-winding B and the series field-winding made up of the coils C and D. The motor is geared to the cable-drum E, which raises and lowers the cage or load W. K is a motor-controller which consists of the row of fixed contacts 1 to 10, inclusive, and the two sets of movable contacts F and G. R is the resistance to which the fixed contacts 1 to 7 are connected. The shunt-winding B is connected directly across the supply-mains 1 and 1' when the switch S is closed and is therefore independent of the controller. When the controller is in its inoperative or "off" position, the motor-armature and the field-coil D are short-circuited by means of the auxiliary contacts $k$ and $k'$, which engage the fixed contacts 8 and 9 only in that position of the controller, this being substantially the arrangement shown in my aforesaid patent, except that in said patent the series field-coil is not present.

When it is desired to raise the cage or weight W, the switch S is closed and the controller is turned so as to bring the contacts F into engagement with the row of fixed contacts. The short circuit produced by the auxiliary contacts $k$ and $k'$ is broken, and the motor is connected to line with a portion of resistance in circuit with the armature and series field-coils, as indicated in Fig. 2. As the movement of the controller is continued the resistance is cut out step by step until the motor is connected directly across the line, as in Fig. 3. The flow of current is the usual one for compound-wound motors—namely, the series winding and the shunt-winding assist each other. For hoisting, therefore, the entire series field might as well be placed at either C or D. Each of these arrangements would, however, possess disadvantages under other conditions, as will appear hereinafter. Upon returning the controller to its off position the auxiliary contacts $k$ and $k'$ short-circuit the armature, causing the motor to act as a brake to bring the load to rest.

In order to lower the load, the controller is turned in the opposite direction, bringing the contacts G into engagement with the row of fixed contacts, and thereby connecting the motor for operation in the reverse direction. The motor connections for lowering are when the controller is in its first lowering position those shown in Figs. 4 and 7—namely, the motor-armature and the series coil D are short-circuited, while the series coil C is connected across the line in series with the resistance R. As the movement of the controller is continued the armature and field-coil D are shunted across increasing amounts of the resistance until finally the armature and the coil D are arranged in shunt with the entire resistance.

If the load is light, so that it is insufficient to overcome the friction, and therefore requires power to make it descend, current is supplied from the mains to the field and the armature of the motor and flows in the direction of the arrows in Figs. 7, 8, and 9. In Fig. 7 practically no current flows from the line through the armature and the series coil D; but as the controller is moved to succeeding positions the armature and the series coil D are supplied with current in multiple, with increasing portions of the resistance until finally, as illustrated in Fig. 9, the armature and the field-coil D are in multiple with the entire resistance. It will be noted that whenever current flows through the coil D of the series winding in lowering a light load the excitation produced by this coil is opposed to that produced by the excitation of the other series coil C. The current which flows through the coil C is always greater than that which flows through the coil D, since it is the sum of the current which passes through the resistance and that which passes through the coil D. Therefore although the series coils oppose each other their aggregate effect is to produce an excitation cumulative to the excitation of the shunt-field, and since no great amount of power is required to propel light loads in their descent the motor as thus connected fulfils all requirements. If the entire series windings were placed at C, it would assist the shunt-winding, producing a very strong field, at a time, however, when it is not needed. If, on the other hand, the series windings were both placed at D, they would oppose the shunt-winding, and by reason of the proportions usually adopted in motors performing this class of work the shunt-field winding would become too weak.

In Figs. 4, 5, and 6 the motor connections are the same as those shown in Figs. 7, 8, and 9; but the directions of the currents are those which take place when the descending load is heavy and is overhauling the motor, thereby causing it to act as a generator to retard the movement of the load. In Fig. 4 the maximum braking effect is produced, since the current generated in the short-circuited armature produces an excitation in the series field-coil D, which assists the excitation of the coils B and C. The load will therefore descend very slowly as long as the controller is left in its first lowering position. As the controller is moved into successive running positions varying portions of the resistance are included in the circuit of the armature and field-coil D. This increases the resistance of the armature-circuit and permits the motor to run at a higher rate of speed. A point will be reached, however, as in Fig. 5, at which potential produced by the motor operating the generator will equal the line potential. At that point no current passes through the resistance from one main to the other, and consequently the field-coil C becomes idle. In the final position, Fig. 6, the motor may be sending current back into the line, in which case current will flow through the field-coil C in the opposite direction from that which passed during the preceding positions of the controller, and therefore the total field will be weaker than at any previous stage. By this means the descending load is kept under perfect control and the rapidity of descent may be regulated. Were both series windings placed at C, they would assist the shunt-winding in the initial position. With a heavy load, however, the cumulative effect would be less than with the arrangement shown, since more current passes through D than C. As soon as the motor began returning current to the line the series winding would oppose the shunt-winding, bringing the field below the normal field produced by the shunt-winding alone. If desired, the shunt field-winding may be connected to the opposite end of the series winding from that shown.

It will now be seen that by the present invention the motor connections are so arranged that desirable and effective results are produced, not only under certain of the conditions to be met in the operation of hoists or elevators, but in all of them, and under no condition is the motor-field weakened below the point at which the shunt-field alone would maintain it—namely, the motor is provided with a powerful field for raising loads—with a weaker field, but one quite strong enough for propelling light loads downward and for retarding the descent of a heavy load.

Although I have described the present invention in great detail as embodied in a preferred form, it is of course understood that many changes may be made in the arrangement of the field-windings and the manner of and means for connecting them in order to produce the desired results.

In the appended claims I aim to cover all modifications within the spirit of the present invention.

What I claim as new, and desire to secure by Letters Patent of the United States, is—

1. In a system of control, a motor having a shunt field-winding and a plurality of series field-windings, and means for connecting said motor to a source of current-supply in such a manner that the effective excitation of the series windings assists that of the shunt-winding both when the motor is propelling a load and when it is overhauled by the load and acting as a generator.

2. In a system of control, a motor having a shunt field-winding and a plurality of series field-windings, means for connecting said motor to a source of supply in such a manner that the motor will run in one direction and the field-windings will assist each other and the shunt-winding in exciting the field, and means for connecting the motor for operation in the reverse direction in such a manner that the effective excitation of the series windings is cumulative to that of the shunt-winding both when the motor is operating as a motor and when it is overhauled by the load and made to operate as a generator.

3. In a system of motor control, a motor having a shunt field-winding and a plurality of series field-windings, means for connecting the motor to a source of current-supply in such a manner that the shunt and series windings assist each other, and means for connecting the motor for operation in the reverse direction in such a manner that the currents flowing through the series windings are unequal and have opposing effects which in the aggregate assist the shunt-winding, the arrangement being such that when the load overhauls the motor and causes it to run as a generator the aggregate effect of the series windings is cumulative to that of the shunt-winding.

4. In a system of control, a motor having a plurality of series windings, means for connecting the motor to a source of current-supply so that the said field-windings assist each other when the motor runs in one direction, and means for connecting said motor for operation in the reverse direction in such a manner that the field-windings oppose each other when the motor is acting as a motor and assist each other when the motor is overhauled by the load and is acting as a generator.

5. In a system of control, a motor having a shunt field-winding and a plurality of series field-windings, means for connecting the motor to a source of current-supply so that the said series field-windings assist each other and the shunt-winding when the motor is operated in one direction, and means for connecting said motor for operation in the reverse direction in such a manner that the series field-windings oppose each other when the motor is acting as a motor and assist each other and the shunt-winding when the motor is overhauled by the load and acts as a generator.

6. In a system of control, a motor having a shunt field-winding and a plurality of series field-windings, means for connecting the motor to a source of current-supply so that the series windings assist said shunt-winding when the motor runs in one direction, and means for connecting a portion of said series field-windings to the source of current-supply and short-circuiting the motor-armature through the remainder of the series windings when the motor is connected for operation in the reverse direction, whereby the shunt-winding is assisted by one or more of the series windings both when the motor is acting as a motor and when it is overhauled by the load and acts as a generator.

7. In a system of motor control, a motor having a shunt field-winding and a plurality of series field-windings, means for connecting said motor to a source of current-supply for rotation in one direction in such a manner that the series field-windings assist each other and the shunt-winding, and means for connecting the motor for rotation in the opposite direction in such a manner that the relative effects of the windings are changed.

8. In a system of control, a motor having a plurality of field-windings, and a controller having contacts constructed and arranged to connect said motor to a source of current-supply with the field-windings arranged in series with each other and with the armature, the contacts being also constructed and arranged to connect a portion of said field-windings as a shunt-winding and short-circuit the armature through the remaining portion of the field-windings.

9. In a system of control, a motor having a plurality of field-windings, a resistance, and a controller having contacts and connections constructed and arranged to connect said motor to a source of current-supply so that the field-windings are in series with each other and with the armature when the motor runs in one direction, or so that the motor tends to run in the opposite direction and the armature is short-circuited through a portion of the windings while the other portion is connected with the source of current-supply through the resistance.

10. In a system of control, a motor having a shunt field-winding and a plurality of series field-windings, and a controller having contacts and connections arranged to connect said motor to a source of current-supply for rotation in one direction, said controller also having contacts constructed and arranged to connect the motor for rotation in the opposite direction with one of its series windings connected to the source of current-supply and with the armature short-circuited through the remainder of the series windings.

11. In a system of control, a motor having a plurality of field-windings, a resistance, and a controller having contacts and connections constructed and arranged to connect said motor to a source of current-supply so that the field-windings are in series with each other and with the armature when the motor runs in one direction, and also having contacts arranged to connect a portion of said series windings to the source of current-supply in series with said resistance and to connect the armature and the remainder of the field-windings in shunt with a portion of said resistance.

12. In a system of control, a motor having a plurality of series field-windings and a shunt field-winding, a resistance, and a controller for connecting said motor to a source of current-supply with the armature in series with the series winding and in parallel with the shunt-winding for rotation in one direction, said controller having contacts connected and arranged to connect the motor for rotation in the opposite direction with a portion of the series windings connected to the source of supply in series with the resistance and the motor-armature and the remainder of the series windings connected in shunt to variable portions of said resistance.

13. In a system of control, a motor having two field-windings, a resistance, and a controller having contacts constructed and arranged to connect said motor to a source of current-supply with the field-windings in series with the armature, said contacts being also constructed and arranged to connect one of said field-windings to the source of current-supply in series with the resistance and to short-circuit the armature through the other field-winding in one position of the controller and to connect the armature and the latter field-winding in shunt with successively-varying portions of said resistance in subsequent positions of the controller.

14. In a system of control, a motor having a shunt field-winding and two series field-windings, a resistance, and a controller having contacts and connections constructed and arranged to connect said motor to a source of current-supply with the armature and series field-windings in series with each other and in parallel with the shunt field-winding, said controller also having contacts arranged to connect said motor to a source of current-supply with one series winding in series with the resistance and in parallel with the shunt-winding and the armature short-circuited through the other series winding in one position of the controller and with the armature and said latter field-winding shunted across varying portions of said resistance in subsequent positions of the controller.

In witness whereof I have hereunto set my hand this 12th day of May, 1905.

MAXWELL W. DAY.

Witnesses:
BENJAMIN B. HULL,
HELEN ORFORD.